Oct. 13, 1953   F. LINDER   2,655,015
THERMALLY RELEASABLE TORQUE LIMITING CLUTCH
Filed Jan. 21, 1948
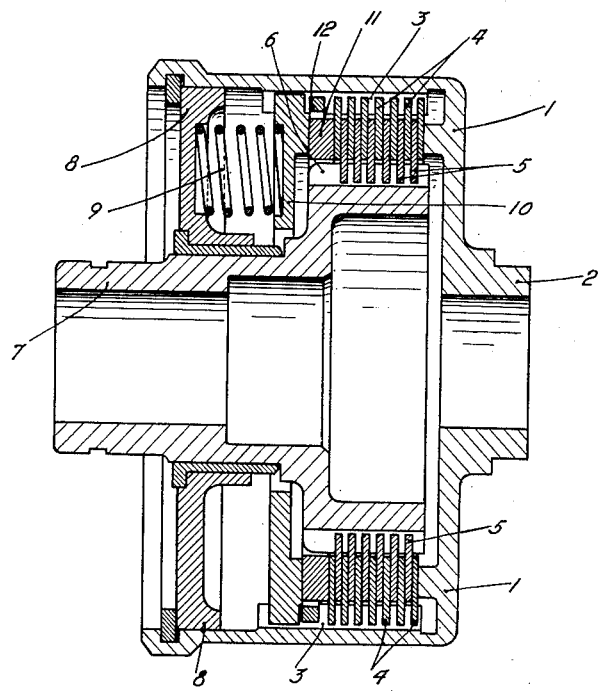
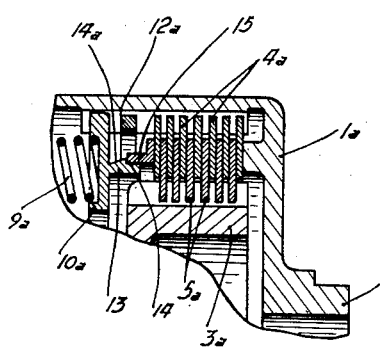
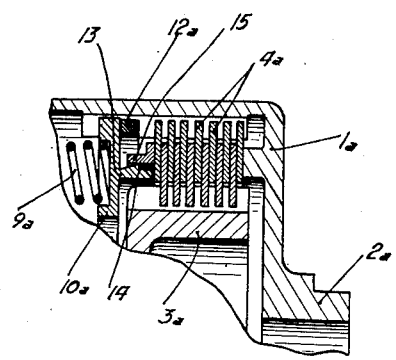
INVENTOR:
FRANCOIS LINDER Patented Oct. 13, 1953

2,655,015

UNITED STATES PATENT OFFICE 2,655,015

THERMALLY RELEASABLE TORQUE LIMITING CLUTCH

François Linder, Bois-Colombes, France

Application January 21, 1948, Serial No. 3,633
In France January 30, 1947

3 Claims. (Cl. 64—30)

Different types of drives are used for accessories, accessory gear boxes etc., particularly on aircrafts, such as torque limiting devices comprising breaking members namely shearing pins, tension breaking shafts, hydraulic clutches, elastic couplings, slipping clutches etc.

A drawback of such breaking mechanism is that they must be dimensioned and adjusted so that undue uncoupling and interruption of torque transmission cannot occur too inopportunely; they have therefore to be constructed so as to be able to transmit a torque comprised between 5 or 10 times the maximum normal operating torque without failure.

The torque limiting devices of the type comprising clutch discs submitted to the action of conveniently set springs for transmission of maximum torque and permitting slipping of the discs in case of sudden acceleration, momentary sticking or locking of the members to be driven, generally operate satisfactorily but have the drawback of heating or being damaged in case of locking of the accessories or accessory gear boxes or the mechanisms to be driven.

The present invention has for its object to provide for a torque limiting device of the friction disc type which overcome the above mentioned drawbacks, this torque limiting device comprising, inserted at any point of the unit constituted by the disc pack and the members exerting a yielding pressure thereon, circular, dilatable and non-fusible means coaxial with the discs and operating under the action of the heat generated after a prolonged slipping of the discs so as to interrupt the transmission in order to suppress the yielding pressure applied to the discs.

The dilatable means mentioned above may consist of a nonfusible ring having preferably a high coefficient of expansion, adapted to expand under the action of the heat so as to be removed from its normal operating position and block interposed between the disc pack on the one hand, and the members exerting a yielding pressure on the discs on the other hand, an abutment being provided for limiting the axial displacement of said pressure members.

In one embodiment of the invention, the dilatable member can be provided between the disc pack and a fixed member acting as an abutment for said discs.

In another embodiment, the dilatable member can be interposed between the members exerting a yielding pressure on the discs and a member acting as an abutment for said pressure members, means being provided to transmit to the dilatable member the heat generated by the slipping of the discs.

Other embodiments including several dilatable members may also be contemplated, said members being located in different points of the mechanism referred to above.

Other features of the invention will appear from the specification given hereafter with reference to the accompanying drawings, illustrating the invention, and in which:

Fig. 1 is an axial section of a thermally releasable torque limiting device of a known type.

Fig. 2 is an axial partial section of an embodiment, shown in operating position, of a torque limiting device according to the invention.

Fig. 3 is a section similar to Fig. 2 showing the device in released position.

In the known embodiment shown in Fig. 1 the torque limiting device comprises a cup shaped member 1 forming one piece with a hub 2 rotatable with a transmission member not shown.

The cup shaped member 1 is provided with splines 3 on which are slidably mounted discs 4 which thus rotate with said cup shaped member, said discs being interleaved with discs 5 slidably mounted on splines 6 of a hub 7 rotatable with another element of the transmission, not shown.

Opposite to the hub 2 the cup shaped member 1 carries an annular plate 8 acting as an abutment for one end of springs 9 (only one spring being shown on the drawings) the other end thereof bearing upon an annular plate 10 constantly urged by said springs towards the disc pack 4—5, the periphery of said annular plate being slidably mounted on the splines 3 of the cup shaped member 1 whereby said plate rotates with cup 1.

A fusible ring 11 (made of Bakelite, anti-friction metal, tin, etc.) is inserted between the annular plate 10 and the disc pack 4—5, to which it transmits the thrust exerted by springs 9.

Besides, a locking ring 12 acting as an abutment is provided in the cup member 1 at a small distance from the annular plate 10 in order normally not to hamper the slight axial clearance of said plate.

In case the device driven through the intermediary of the torque limiting clutch becomes locked, a slipping action intervenes between the discs 4 and 5, and if the cause of the locking ceases rather promptly, the slipping stops and the torque transmission occurs again normally. If the locking persists, the slipping of the discs 4 and 5 brings about a heating causing a melting of the ring 11 (or at least a distortion by melting), whereby the spring loaded plate 10 is moved into abutment with the locking ring 12. At this moment, no more pressure is exerted on the discs which may then rotate freely, thus avoiding any damage to the elements of the released mechanism: the bringing thereof into operative condition will merely require a replacement of the fusible ring.

A drawback of such a device is that the molten material of the fusible ring 11 is ejected in the device and risks to damage said device.

In the embodiment according to the invention and shown in Figs. 2 and 3 the annular plate 10a is formed with an annular projection 13 having a shoulder 14 with a clearance 14a and acting as a support for a ring 15. The annular plate 10a and its annular projection 13 are made of a material having a low coefficient of expansion (for example steel) while the ring 15 is made of a material having a high coefficient of expansion (for example aluminium).

In case of locking of the mechanism to be driven and of slipping of the discs 4a—5a, the ring 15 contacting the disc pack, is heating faster than the annular plate 10a and will expand more rapidly. For a certain temperature, the ring 15 will get from the shoulder 14 and the annular plate 10a will come into abutment with locking ring 12a; the discs 4a—5a will be no longer submitted to the action of the springs 9a, thus enabling a free relative rotation of the members 1a, 2a and 3a.

It is obvious that the embodiment of the torque limiting device or clutch described above and shown in the annexed drawings is only given by way of example and that various modifications may be brought into said clutch without departing from the spirit of the invention. For instance, the effect of expansion of the ring 15 could be amplified by means of a system increasing its mechanical advantage to amplify the sensibility of the mechanism.

What I claim is:

1. Torque limiting device including a hub member provided with radial splines parallel to the axis, discs provided with grooves and sliding over the splines of the hub member, a cup shaped member coaxial with the hub member, partly overlapping the latter and provided inside with splines parallel to the axis, grooved discs inserted between the first said discs and sliding along said internal splines, an annular plate mounted at the edge of the cup-shaped member, springs bearing at one end upon the annular plate and distributed around the axis inside the cup-shaped member, a ring-shaped member located in said cup-shaped member urged by said springs towards the disc pack having an annular projection with a shoulder, an expansible ring made of nonfusible material having a great coefficient of expansion located between said annular projection and the disc pack and positioned by the shoulder, said shoulder having a height such that said expansible ring may get clear from said shoulder under the action of a given rise of temperature, and an abutment provided inside the cup-shaped member for limiting the stroke of the ring-shaped plate when the ring is expanding under the action of the heat and gets clear from the shoulder which positions said ring.

2. In a torque limiting device, in combination, a casing; driving and driven members located in said casing and frictionally bearing against each other for transmitting a drive between said driving and driven members; and control means operatively connected to said members for maintaining the same in driving engagement with each other only until a predetermined temperature resulting from mutual slipping of said members is reached, said control means comprising a first annular ring engaging one of said members and a second annular ring having an outer peripheral shoulder portion engaging an inner peripheral edge portion of said first ring at the side thereof distant from said one member to maintain said first ring in a position where said members are in driving engagement with each other, said shoulder portion of said second ring having an outer diameter which is substantially smaller than the outer diameter of said first ring and said first ring having a coefficient of expansion which is substantially larger than the coefficient of expansion of said second ring so that said first ring expands during a rise in temperature resulting from mutual slipping of said members at a rate substantially greater than the rate of expansion of said second ring, whereby the inner diameter of said first ring will expand during such a rise in temperature to a size greater than the outer diameter of said shoulder portion of said second ring so as to prevent said second ring from maintaining said first ring in said position thereof when the temperature of said first ring reaches a predetermined value.

3. In a torque limiting device, in combination, a casing; annular driving and driven members located about a common axis in said casing and frictionally bearing against each other for transmitting a drive between said driving and driven members; a first ring having its center located in said axis and being mounted in said casing for movement toward and away from said members, said first ring having a peripheral portion of predetermined diameter located adjacent and directed toward said members; spring means operatively connected to said first ring for urging the same toward said members; stop means located in said casing for limiting the movement of said first ring toward said members to a position where said members are out of driving engagement with each other so that said first ring cannot maintain said members in driving engagement with each other; and a second ring having its center also located in said axis and being located between said first ring and said members in engagement with one of said members and in engagement with said peripheral portion of said first ring, said second ring having an inner diameter slightly smaller than the outer diameter of said peripheral portion of said first ring and having a coefficient of expansion substantially greater than the coefficient of expansion of said first ring so that when the temperature of said second ring rises during mutual slipping of said members, said second ring will expand to a point where said peripheral portion of said first ring will slip into said second ring under the action of said spring means, whereby said second ring will maintain said members in driving engagement only until said second ring rises in temperature to a predetermined value.

FRANÇOIS LINDER.

References Cited in the file of this patent

UNITED STATES PATENTS

| Number | Name | Date |
|---|---|---|
| 1,482,402 | Lamb | Feb. 5, 1924 |
| 1,946,956 | Waseige | Feb. 13, 1934 |
| 2,140,723 | Spicer | Dec. 20, 1938 |
| 2,224,440 | Lewis | Dec. 10, 1940 |
| 2,314,227 | Lieberherr | Mar. 16, 1943 |

FOREIGN PATENTS

| Number | Country | Date |
|---|---|---|
| 510,000 | Germany | 1930 |